Nov. 15, 1932.      A. CODD      1,887,544
WHEEL
Filed March 30, 1931      2 Sheets-Sheet 1

AMBROSE CODD  Inventor

By  Herbert E. Smith
Attorney

Nov. 15, 1932.  A. CODD  1,887,544
WHEEL
Filed March 30, 1931  2 Sheets-Sheet 2

AMBROSE CODD
Inventor

By  Attorney

Patented Nov. 15, 1932

1,887,544

UNITED STATES PATENT OFFICE

AMBROSE CODD, OF SPOKANE, WASHINGTON

WHEEL

Application filed March 30, 1931. Serial No. 526,206.

My present invention relates to improvements in wheels of the type employed on automotive vehicles, especially those vehicles, trucks, tractors &c. that are utilized in heavy work and upon rough roads or surfaces. In carrying out my invention I utilize a pair of duplex tires and rims mounted on a single wheel which tires are relatively movable and also movable relatively to the wheel, transversely of the axis of the wheel or its shaft or axle.

The pair of relatively movable tires and rims are arranged in such manner that they automatically adjust themselves to positions in which both tires of the wheel will at all times have their treads upon the ground surface, regardless of whether the surface be smooth and even, or rough and uneven, thus insuring a maximum bearing surface or tread surface for the wheel at all times to support the load imposed on the wheel.

Means are also provided whereby the relatively movable duplex tires and rims may be rigidly locked or fastened together with relation to the wheel, as for emergency use, or for use on smooth roadbeds and streets.

The invention consists essentially in the combination and arrangement with a wheel of the duplex tires and rims and a series of rocker-links fulcrumed on the wheel and connecting the rims transversely of the wheel, as will hereinafter be more fully set forth and claimed. In the accompanying drawings I have illustrated one complete example of the physical embodiment of my invention wherein the parts are combined and arranged according to one mode I have thus far devised for the practical application of the principles of my invention.

Figure 10:
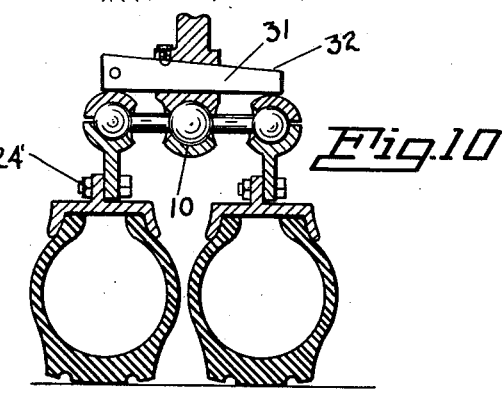
Figure 4:
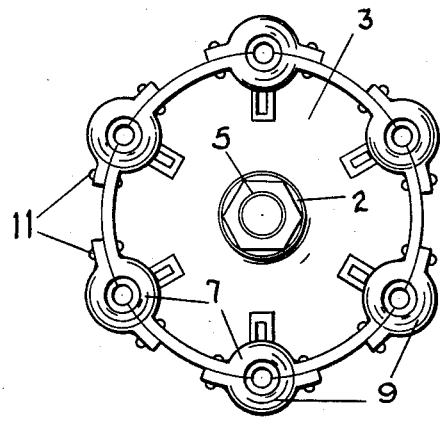
Figure 4 is a face view of the disk-wheel with the rim and tires removed.
Figure 5:
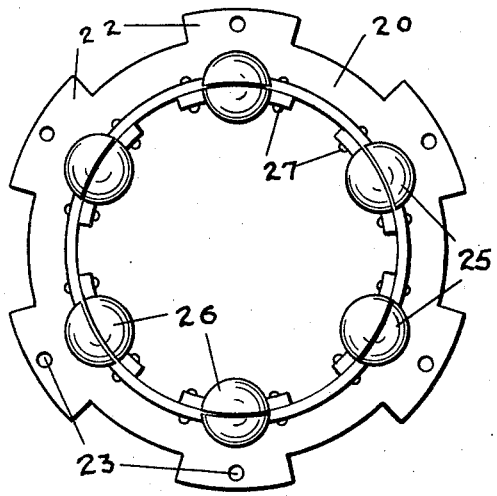
Figure 5 is a face view of one of the rim rings detached from the rim.
Figure 7:
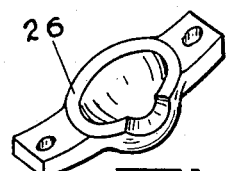
Figure 6:
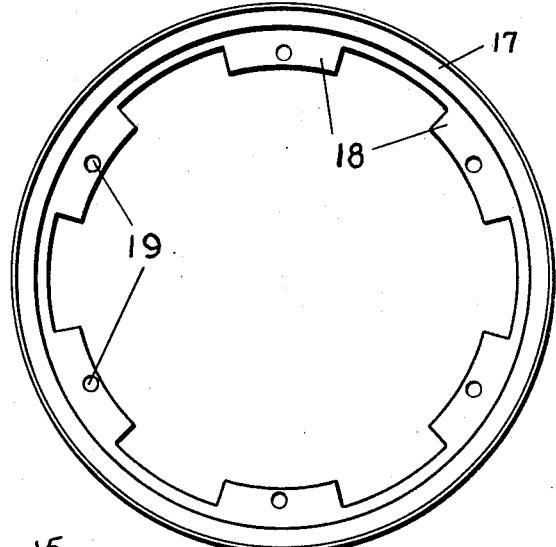
Figure 6 is a face view of one of the rims.
Figure 8:
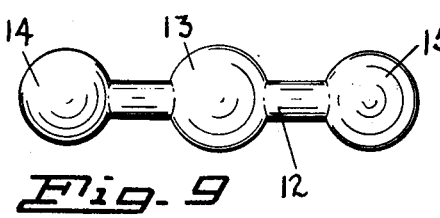
Figure 9:
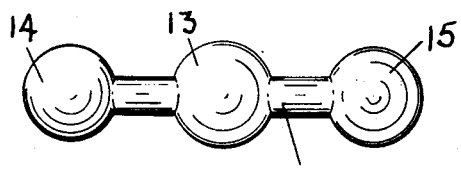

Figure 7 is a perspective view of one of the bearing caps of the rims. Figure 8 is a perspective view of one of the fulcrum bearing caps. Figure 9 is a view of one of the rocker-links. Figure 10 is a sectional detail view showing one of the locking wedge-keys in position to rigidly fasten together the rims and the wheel.

Figure 1:
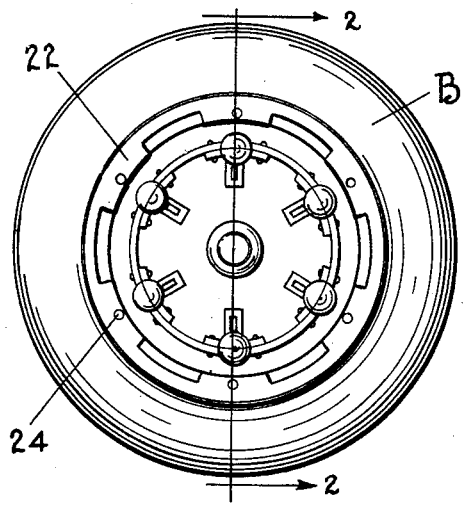
Figure 1 is a view in side elevation of a wheel embodying my invention.
Figure 2:
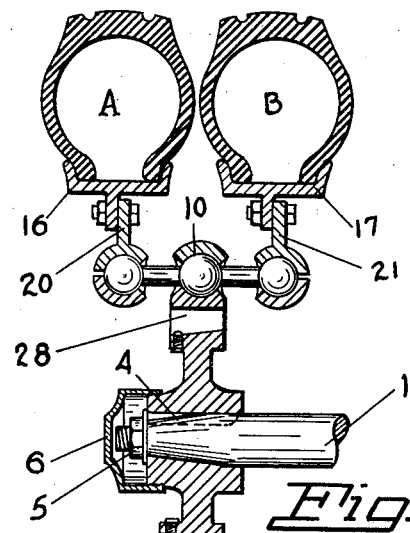
Figure 2 is an enlarged vertical sectional view, as at line 2—2 of Figure 1.
Figure 3:
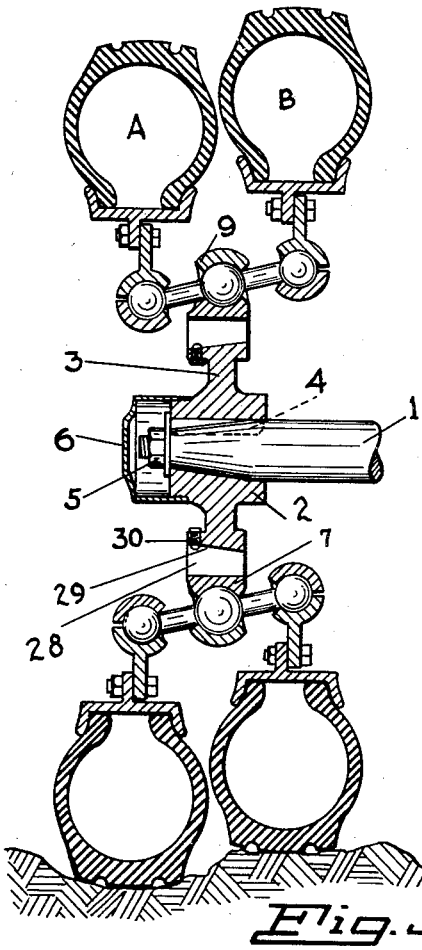
Figure 3 is a view similar to Figure 2 but showing the wheel on uneven ground.

In the preferred form of my invention as shown in the drawings a portion of an axle or drive shaft 1 is indicated upon which the hub portion 2 of a disk wheel 3 is secured as by a key 4, the usual nut 5 and cap 6 being indicated in Figures 2 and 3.

On the periphery of the wheel are arranged a series of spaced bearing heads 7, here shown as six in number, and these bearing heads are fashioned with concave bearing faces 8. Each bearing head has a flanged bearing cap as 9 that is provided with a complementary concave bearing face 10, and bolts 11 are employed to secure the caps over the heads. The bearing heads and bearing caps form fulcrum sockets, open at the sides of the wheel, and in these sockets are supported rocker-links 12, each of the links being provided with a central ball or spherical head 13 and two end balls or spherical heads 14 and 15. The center balls or heads are retained in the fulcrum sockets by means of the caps and the links extend transversely of the wheel, with an end head located at each side of the wheel. The links are permitted to rock in their fulcrum-bearings within the limits of the walls of the lateral openings of the bearings, and the center balls of course retain their same relative position with relation to the wheel.

Two pneumatic tires A and B of standard type are supported on the wheel and replaceable when required. The tires are provided with rims indicated at 16 and 17, and the inner periphery of each rim is provided with a series of spaced, vertical lugs 18 each having a bolt hole 19.

Each rim is mounted on a rim-ring, as 20 and 21, and these rings are fashioned with complementary lugs 22 and bolt holes 23 for use with the lugs and holes of the rims. The registering bolt holes 19 and 23 receive the fastening bolts 24, and by means of the bolts the tires and their rims are rigidly secured on the rings. In mounting or demounting the tires the bolts are passed through the perforated lugs and secured by nuts as 24', and of course in demounting the nuts are removed to permit withdrawal of the tire and its rim from the ring. The rims and their rings are thus rigidly locked together by means of the bolts and nuts, that is, each rim is rigidly locked on its rim-ring.

On the inner periphery of each ring are fashioned concave, hemi-spherical bearing heads 25, and each of these bearing heads is provided with a complementary bearing cap 26 having perforated flanges and secured to the ring by bolts 27. As seen in Figures 2 and 3 the adjoining sides of the bearings on the two rings are open while the remote sides are closed, and these bearings form sockets for the reception and retention of the spherical heads 14 and 15 of the rocker-links.

In Figure 2 the two tires are represented as traveling over a smooth and even surface, as a cement roadway, while in Figure 3 the tires are represented as traveling over a rough and uneven surface. In both instances the benefit of the maximum or full width of the tread surface of the two tires is obtained and both tires support the load.

In Figure 3 as one tire, (in following the contour of the surface of the ground) moves vertically with relation to the other tire, the rocker-links rock on their fulcrums to compensate for the movement of the tire, and in this position indicated in Figure 3 the limit of movement of one tire with relation to the other has been reached. The ball and socket fulcrums and the ball and socket joints of the rocker-links provide rugged and durable connections between the wheel and the tires and the power is transmitted from the wheel to the rims and tires through these connected parts, the tractive force of the maximum width of the tread being applied to the ground surface regardless of the relative positions of the tires.

It will be apparent that the weight of the load is equally distributed on the two tires, and one tire is not called upon to bear the load when traveling over a rough road.

In case of emergency, as for instance the puncturing of a tire, the two tires of the wheel may be rigidly connected to prevent relative movement, and in some conditions, when traveling on a smooth and even road surface where the relative movement is not required, the tires may be rigidly coupled together and rigidly coupled to the wheel.

For this purpose the wheel is provided with a series of radially disposed, transversely extending slots 28, diametrically alined with the fulcrum bearings, and preferably the inner wall 29 of each slot is arranged obliquely to the outer wall, and a set bolt 30 is threaded through a suitable hole in the flanged wall of the slot.

Each of these slots is designed to receive a tapered key 31 having a wedge edge 32 complementary to the oblique wall 29 of the slot. As seen in Figure 10 a wedge is driven into each of the slots from the outer side of the wheel, and the edge of the key that is parallel with the axis of the wheel frictionally engages the bearing heads, or rather the bearing caps 26 of the two rim rings. The locking keys thus effectually prevent relative movement of the two rings and the parts supported thereby, and the tires, rims, rings and rocker-links are thus made rigid with the wheel. After the locking keys have been driven into locking position, the set bolts 30 are screwed tight against the oblique face or edge of the keys to hold them against longitudinal movement and retain them in locking position.

When the parts are thus locked together, as indicated in Figure 10, the two tires have their treads alined with the axis of the wheel and the treads remain in this alinement. If one of the tires has previously been punctured, this arrangement of the tires relieves the punctured tire of any load and imposes the load on the inflated tire, thus preventing rupturing of the deflated tire.

Having thus fully described my invention, what I claim as new and desire to secure by Letters Patent is:—

1. The combination with a wheel, of a pair of relatively movable tires, a series of rocking elements mounted on the wheel, jointed connections between said wheel and tires, and means for rigidly locking said tires with the wheel.

2. The combination with a wheel, a series of rocking-links and ball-and-socket joints between said links and wheel, of a pair of rim-rings, ball-and-socket joints between said rim-rings and the ends of said links, and removable means mounted on the wheel for frictional engagement with said rings for locking the rings and wheel in rigid relation.

3. The combination with a wheel, a series of rocking-links and ball-and-socket joints between said links and wheel, of a pair of rim-rings, ball-and-socket joints between said rings and the links, and a series of wedge keys adapted for insertion in slots in the wheel for frictional engagement with said rings, for the purpose described.

4. The combination with a wheel and a series of transversely arranged rocking links fulcrumed thereon, of a pair of rim-rings and spaced hemi-spherical bearing heads on the inner periphery of said rim-rings, spherical heads on the ends of said links seated in the bearing heads, removable bearing caps attached to said bearing heads to form sockets for the spherical heads, a rim rigidly mounted on each rim-ring, and tires mounted on said rims.

5. The combination with a wheel and a series of transversely arranged rocking links fulcrumed thereon, of a pair of rim rings having attaching lugs on their outer peripheries, a pair of rims having complementary attaching lugs, bolts for rigidly securing said lugs, tires mounted on the rims, spaced hemispherical bearing heads on the inner periphery of the rim rings, spherical heads on the ends of the links seated in said bearing heads, and removable bearing caps attached to said bearing heads to form sockets for the spherical heads.

6. The combination with a wheel having a series of spaced concave bearing heads, of a series of transversely arranged rocking links, a spherical head on each link seated in a bearing head, a concave bearing cap attached to each bearing head to form a socket for a spherical head, a pair of rim-rings and spaced hemi-spherical bearing heads on the inner periphery of said rim-rings, spherical heads on the ends of said links seated in the last mentioned bearing heads, removable bearing caps attached to the latter bearing heads to form sockets for the end-heads of said links, a rim rigidly mounted on each rim-ring, and tires mounted on the rims.

In testimony whereof I affix my signature.

AMBROSE CODD.